United States Patent [19]

Hayashi et al.

[11] Patent Number: 4,540,252

[45] Date of Patent: Sep. 10, 1985

[54] SIDE-MIRROR DRIVING APPARATUS

[75] Inventors: Mikio Hayashi, Oubu; Kouzi Kawasumi, Nagoya; Yoshinobu Kimura, Chiryu, all of Japan

[73] Assignee: Nippondenso Co., Ltd., Kariya, Japan

[21] Appl. No.: 602,746

[22] Filed: Apr. 23, 1984

[30] Foreign Application Priority Data

Feb. 2, 1984 [JP] Japan .................................. 59-18956

[51] Int. Cl.³ .............................................. G02B 5/08
[52] U.S. Cl. ................................... 350/634; 350/637; 318/466; 74/479; 74/567
[58] Field of Search ............... 350/637, 633, 634, 636, 350/605; 318/466; 74/479, 567

[56] References Cited

U.S. PATENT DOCUMENTS 4,108,541 8/1978 Eiratsu ..................... 350/636

Primary Examiner—Jon W. Henry
Attorney, Agent, or Firm—Cushman, Darby & Cushman

[57] ABSTRACT

A side mirror driving apparatus having a side mirror swingably attached to a housing and a driving apparatus supported by the housing. The driving apparatus includes a gear driven by an electric motor and the mirror is operatively linked with the gear by means of a lift lever so that the mirror is inclined in an up-and downward direction and/or left-and rightward direction. At a side of a rear surface of the gear, there is provided a set position stopping device, so that the mirror can be automatically returned to its initial position.

6 Claims, 14 Drawing Figures

SIDE-MIRROR DRIVING APPARATUS

BACKGROUND OF INVENTION

1. Field of Invention

The present invention relates to a side-mirror driving apparatus for driving a side-mirror of a motor vehicle by a remote-control, and more particularly to a side-mirror driving apparatus in which the side-mirror is included during a predetermined time or by a predetermined angle so as to confirm an obstacle behind the motor vehicle in a wide angular range when turning the vehicle to the right or the left, changing a driving lane or driving the vehicle in a backward direction, and the side-mirror is automatically returned to its initial position.

2. Brief Description of Prior Art

Various types of apparatuses, for controlling a side-mirror of a motor vehicle to a desired position by a remote-control, are well known in the art. It is necessary to confirm a presence of an obstacle behind a motor vehicle or another motor vehicle, when starting the motor vehicle, driving it in a backward direction, turning it to the right or the left or changing a driving lane, and it may be posible to confirm safety in a rear field of vision by driving a conventional apparatus by remote-control. However, since the conventional side-mirror driving apparatus does not have a function to automatically return the side-mirror to its initial position, it is very troublesome and takes much time to return the side-mirror to a predetermined (initial) position and thereby it is not practically possible to confirm safety in a rear field of vision of a wide angular range by inclining the side-mirror during running of the motor vehicle.

SUMMARY OF INVENTION

It is, therefore, an object of the present invention to overcome drawbacks of the above-described conventional apparatus and to provide a side-mirror driving apparatus which is new and capable of automatically returning a side-mirror to its initial position after inclining the side-mirror in order to confirm safety in a rear field of vision.

According to the present invention, to achieve the above object, a gear driven by an electric motor is housed in and supported by a mirror driving housing so that a side-mirror swingably attached to the mirror driving housing is inclined up- and downwardly and/or left- and rightwardly, a rear surface of the mirror is swingably linked to a front surface of the gear by means of a lift lever, and a set-position stopping device is provided on a side of a rear surface of the gear for automatically stopping the gear at a predetermined position (initial position).

DETAILED DESCRIPTION OF PREFERRED EMBODIMENTS

The present invention will be hereinafter explained with reference to the attached drawings.

In FIGS. 1 to 5, showing a first embodiment of the present invention, numeral 1 designates a mirror housing attached to a motor vehicle, and a mirror 111 and a mirror driving apparatus are housed therein. Numerals 101 and 102 designate a first and a second casing for constituting a mirror-driving-housing and they are fixed to each other in a well-known manner. The first casing is fixed to the mirror housing 1 by a well-known means not shown in the drawings, or fixed to a well-known driving device (not shown) for adjusting the mirror to a desired position. Integrally formed on almost a center of the first casing 101 is a supporting shaft 103 for supporting by a ball-joint a center of a rear surface of a supporting plate 110 for the mirror 111, and a ball portion 103a is formed at its forward end to be engaged into a socket portion 112 on the rear surface of the supporting plate 110. By these construction, the supporting plate 110 is swingably supported with respect to the supporting shaft 103. The mirror 111 has a slight convex surface and is secured to the supporting plate 110 in a well-known manner.

Figure 1:
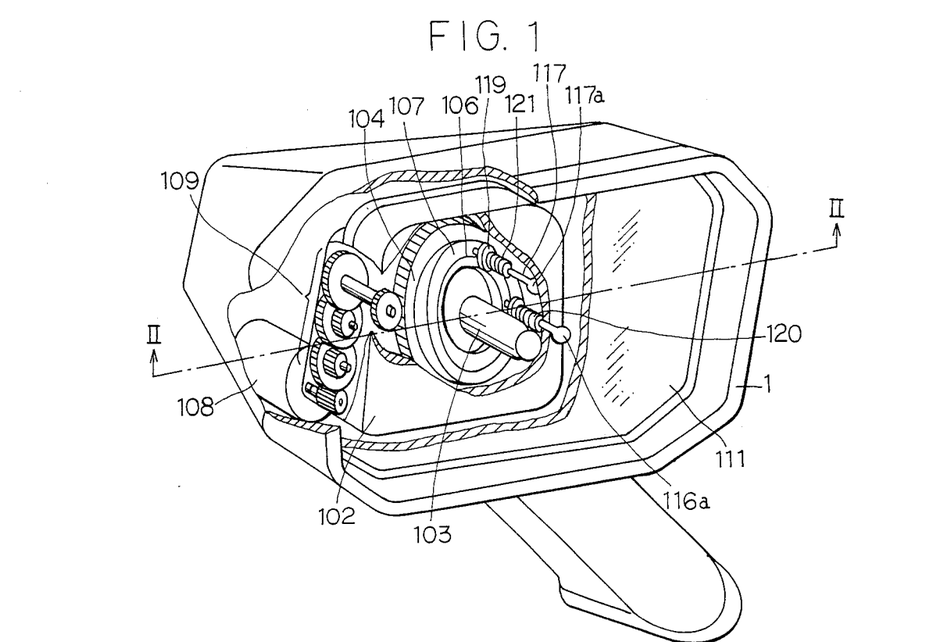
FIG. 1 is a perspective and partly cross-sectional view showing a side-mirror driving apparatus according to the first embodiment of the present invention.
Figure 2:
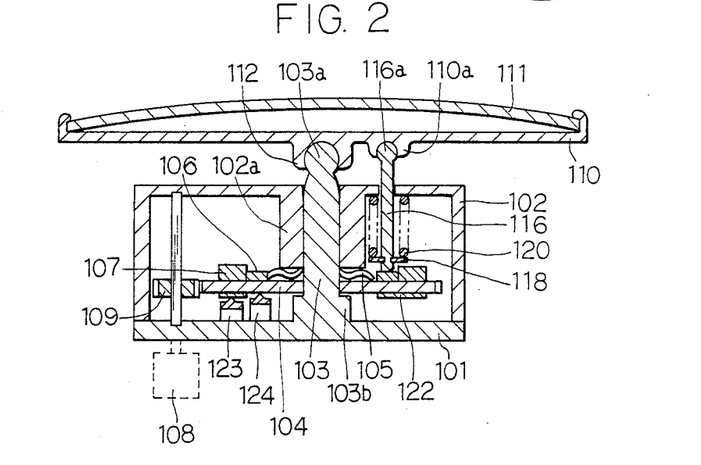
FIG. 2 is a sectional view taken along a line II—II of FIG. 1.

Numeral 104 designates a gear rotatably supported by the supporting shaft 103, and the gear is drivingly connected to an electric motor 108 through a reduction mechanism 109.

The rear surface of the gear 104 abuts on a step portion 103b of the supporting shaft 103 and a spring washer 105 is interposed between the front surface of the gear 104 and a lower surface of a projection 102a of the second casing 102, through which the supporting shaft 103 is extending, whereby the axial movement of the gear 104 is restricted.

On the front surface of the gear 104, there are cocentrically formed a first and a second ring-formed cam members 106 and 107, and each lower end of a first and a second lift levers 116 and 117 is respectively abutted on each cam surface. The levers are slidably supported by through-holes formed in the second casing 102, and ball portions 116a and 117a formed on each forward end thereof are engaged into socket portions 110a and 110b formed on the rear surface of the suporting plate 110, constituting ball and socket joints. Near to the lower end of the respective lift levers, there is formed an annular groove, into which a snap washer 118 and 119 is set. A first and a second springs 120 and 121 are disposed between the snap washers and the surface of the second casing 102 to urge the lift levers 116 and 117 to the cam surfaces, respectively.

Fixed to the rear surface of the gear 104 is a ring 122 made of an electrically conductive material, such as copper, and a first and a second brush springs 123 and 124 secured to the first casing 101 so constructed that their forward ends slide on the copper ring 122. As clearly understood from FIG. 5, the copper ring 122 is provided with a notch 122a so that the second brush spring 124 becomes out of engagement with the copper ring 122 at this position. The copper ring 122 and the pair of brush springs 123 and 124 constitute a set-position stopping device for stopping the gear 104 at a desired position (initial position).

Now, a control circuit for the above-described first embodiment of the present invention will be explained with reference to FIG. 6.

Figure 6:
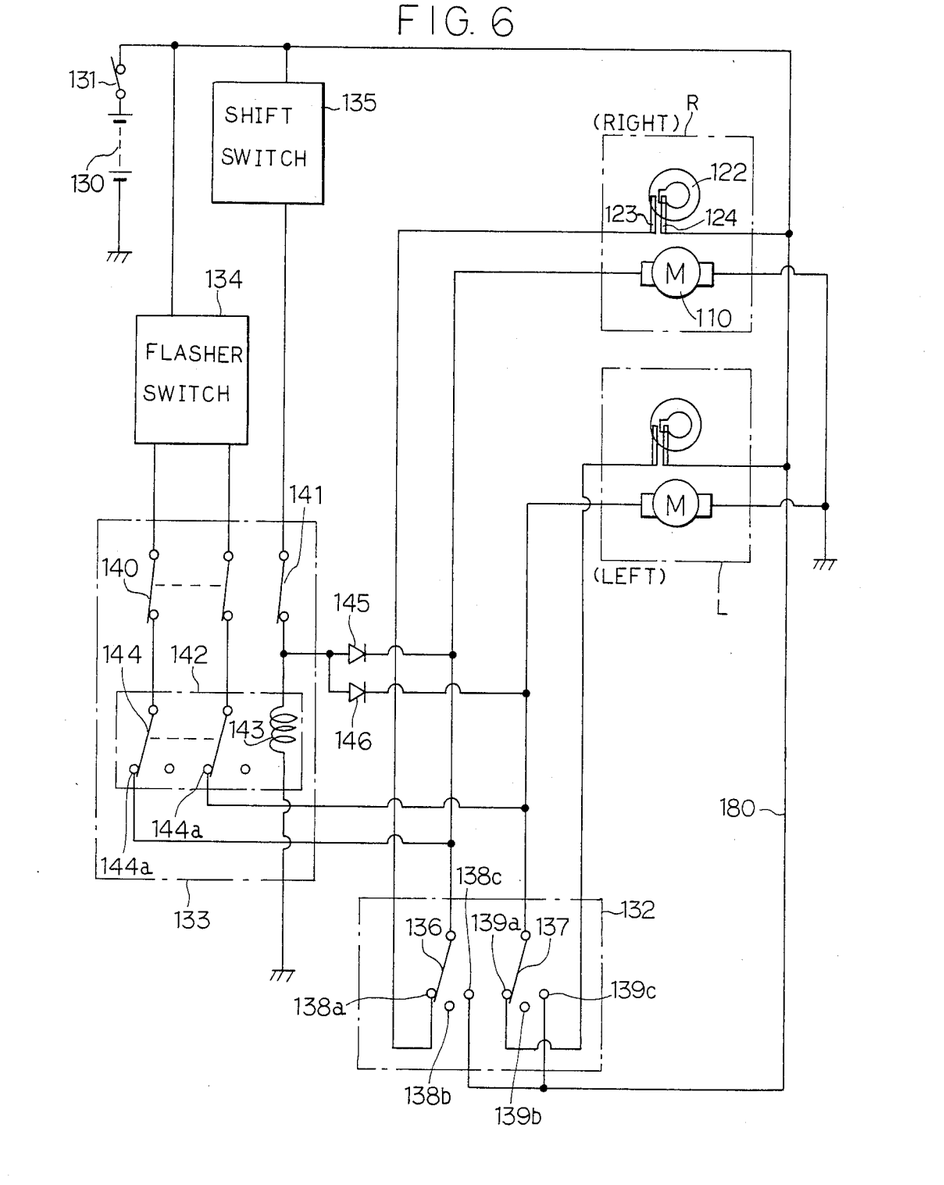
FIG. 6 is a control circuit for the driving apparatus of the first embodiment.

In FIG. 6, numeral 130 designates a battery mounted on a motor vehicle for supplying electric power through an ignition switch 131 to various electric loads on the motor vehicle.

R and L show schematic electric wiring conditions (driving circuits) for the above-described driving apparatuses attached to the righthand and the lefthand portions of the motor vehicle. Numeral 132 designates a manual switch for a case of driving the side-mirror independently of a flasher switch 134 or a shift switch 135 of a transmission, and numeral 133 is a switch for a linkage operation of a side-mirror driving and the flasher switch 134 or the shift switch 135.

The manual switch 132 includes movable contacts 136 and 137 for independently controlling the righthand and lefthand driving apparatuses and the movable contacts 136 and 137 are manually connected to one of fixed contacts 138a to 138c and 139a to 139c, respectively. The movable contacts 136 and 137 are respectively connected to the electric motors 110 of the right- and left-hand driving apparatuses, while the first fixed contacts 138a and 139a are respectively connected to the first brush springs 123 of the right- and lefthand driving apparatuses.

The second fixed contacts 138b and 139b are idle contacts and the third fixed contacts 138c and 139c are respectively connected to the second brush springs 124 of the right- and lefthand driving apparatuses.

The movable contacts 136 and 137 are normally contacted with the first fixed contacts 138a and 139a, and constitute a part of a power supply path for driving the respective gears to the desired positions when the driving apparatuses are operated under the linkage with the flasher switch or the shift switch. When driving the side-mirror independently of the flasher switch or the shift switch, the movable contact 136 or 137 is connected to the third fixed contact 138c or 139c. Under this condition, electric power from the battery 130 is supplied to the electric motor 110 of the right- or lefthand driving apparatus through a connecting line 180, the fixed contact 138c or 139c and the movable contact 136 or 137, and then the mirror is moved as described later. When the movable contact 136 or 137 is thereafter connected to the first fixed contact 138a or 139a, power supply to the motor continues through the second brush spring 124, the copper ring 122, the first brush spring 123, the first fixed contact 138a or 139a and the movable contact 136 or 137. When the motor is further rotated and then the electrical connection between the second brush spring 124 and the copper ring 122 is cut off, the power supply to the electric motor is stopped to thereby stop the mirror at the initial position.

The switch 133 includes manual switches 140 and 141 and a magnet switch 142 having an electromagnetic coil 143 connected to the switch 141 and normally-closed movable contacts 144 respectively connected to the switch 140. The switch 141 is connected to the right- and lefthand electric motors through diodes 145 and 146, respectively. The manual switch 140 is connected to the flasher switch 134, so that when the flasher switch is closed the electric power is supplied to the motor of the right- or lefthand driving apparatus through the flasher switch. On the other hand, since the manual switch 141 is connected to the shift switch 135, which is closed when the motor vehicle moves in a backward direction, both of the right- and lefthand driving apparatuses are simultaneously operated when the motor vehicle moves in the backward direction. At the same time, the electromagnetic coil 143 is supplied with electric current to open the normally closed movable contacts 144.

Figure 3:
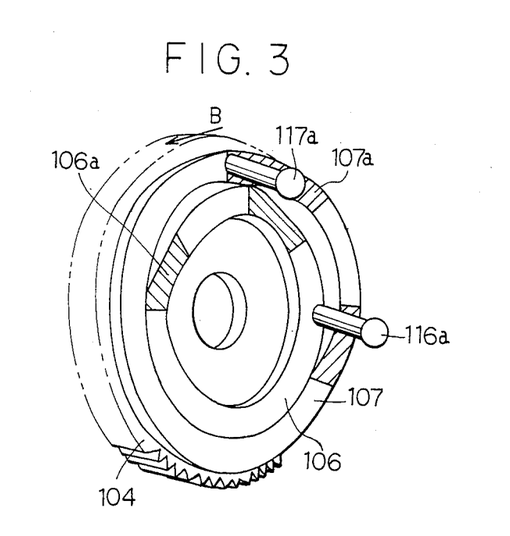
FIG. 3 is a perspective view of a gear constituting a principal portion of the first embodiment.
Figure 4:
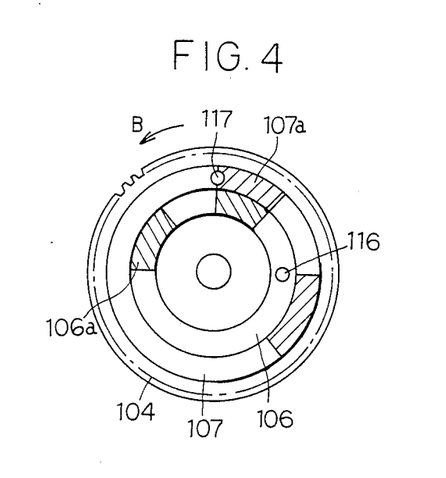
FIG. 4 is a front view showing a front surface of the gear.
Figure 5:
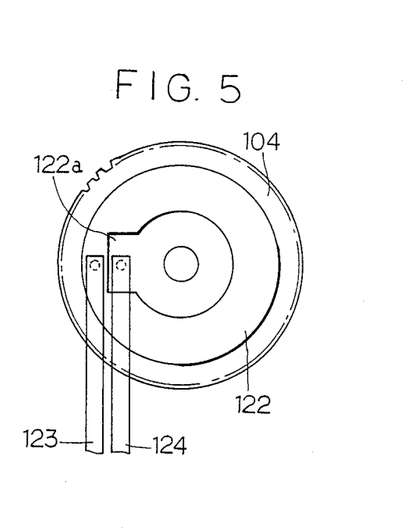
FIG. 5 is a front view showing a rear surface of the gear.
Figure 7:
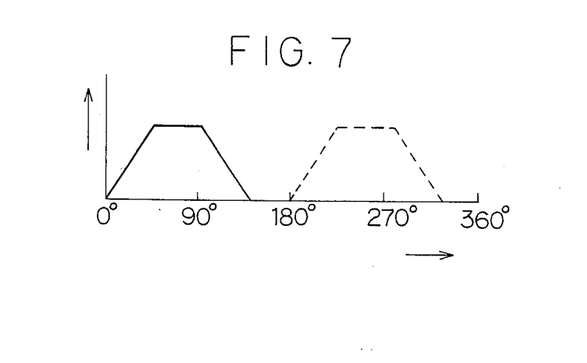
FIG. 7 is an operation-explanatory drawing showing a stroke of a lift lever with respect to a rotational angle of the gear.

Assuming that the lift levers 116, 117 are engaged with the respective cam surfaces as shown in FIG. 3 or FIG. 4, at the initial position of the mirror, the second lift lever 117 moves upwardly and downwardly along its cam surface 107a when the gear 104 is rotated in a direction of an arrow B. The second lift lever 117 moves as shown by a solid line in FIG. 7 and as a result the mirror 111 swings in and up- and downward direction. When the gear is further rotated, the first lift lever 116 moves upwardly and downwardly, as shown by a dotted line in FIG. 7, along its cam surface 106a to swing the mirror in a right- and lefthand direction. And when the gear is further rotated, the electrical connection between the second brush spring 124 and the copper ring 122 is cut off so that the gear 104 is stopped at the predetermined initial position.

Figure 8:
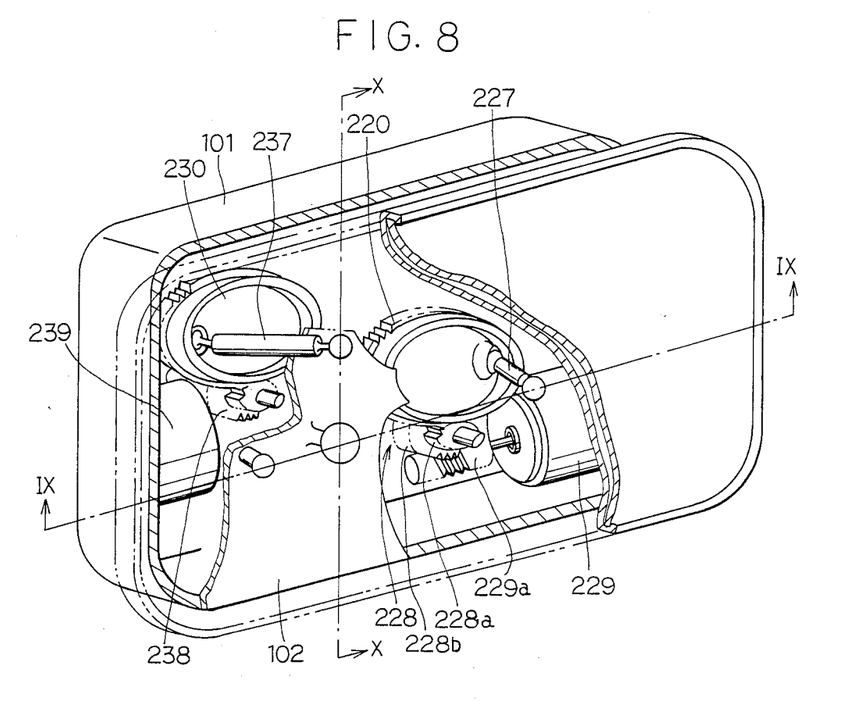
FIG. 8 is a perspective and partly cross-sectional view showing a side-mirror driving apparatus according to the second embodiment of the present invention.

A second embodiment of the present invention will be next explained with reference to FIGS. 8 to 10. In the drawings, the same numerals or the same letters designate the same or similar construction as in the first embodiment, and the explanation of those parts is omitted.

Figure 9:
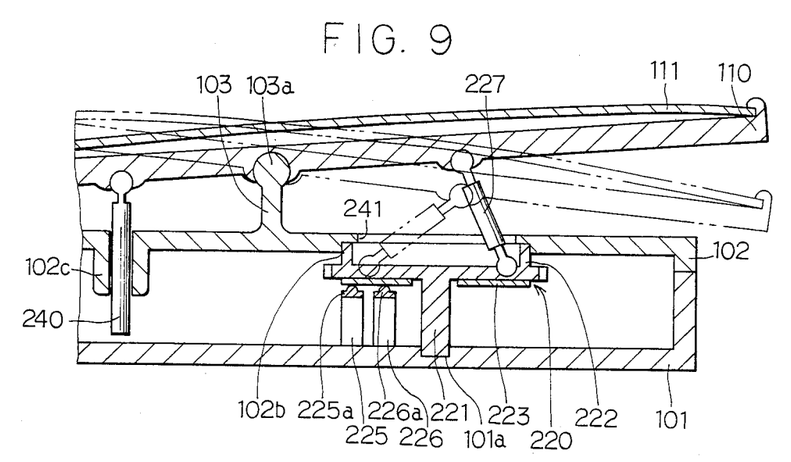
FIG. 9 is a cross-sectional view taken along a line IX—IX in FIG. 8, showing a principal portion thereof.
Figure 10:
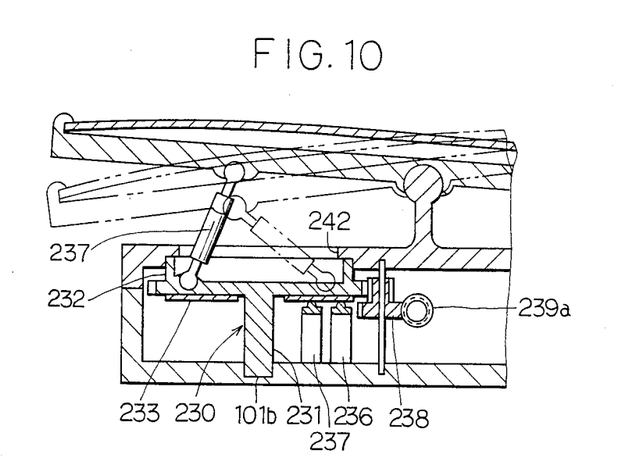
FIG. 10 is a cross-sectional view taken along a line X—X in FIG. 8, showing a principal portion thereof.

In the drawings, numeral 220 designates a first gear rotatably supported by the mirror driving housing (101, 102), a shaft 221 which is integrally formed with the gear 220 and extends from the center thereof is supported by a bearing portion 101a formed in the first casing 101, and an annular projection 222 which is formed integrally with and on the front surface of the gear is supported by a bearing portion 102b formed in the second casing 102 as best shown in FIG. 9. As in the first embodiment, a copper ring 223 is fixed to the rear surface of the first gear 220, and a pair of brush springs 225 and 226 are secured to the first casing 101 so that the forward ends 225a and 226a thereof slide on the copper ring 223 and the electrical connection between the copper ring 223 and the brush spring 226 is cut off when the forward end 226a of the second brush spring is placed at a notch (not shown) formed in the copper ring 223.

Numeral 227 designates a first lift lever linked by respective ball and socket joints to the supporting plate 110 and to the first gear 220 at its front surface and inner side of the annular projection 222, so that the lever 227 is swingable with respect to the supporting plate 110 and the first gear 220, respectively.

The shaft 221 of the first gear 220 is supported by the first casing at a portion horizontal to the supporting shaft 103, so that the mirror 111 swings in a right- and leftward direction when the mirror is driven by the rotation of the gear 220.

Numeral 228 is an intergear for reduction and rotatably supported by the mirror driving housing, a spur gear 228a and a worm gear 228b of which are engaged with the first gear 220 and a worm 229a fixed to an output shaft of the first electric motor 229, respectively.

Numeral 230 designates a second gear having the same construction as that of the above-described first gear 220 and a shaft 231 thereof is supported by a bearing portion 101b of the first casing 101 at a portion vertical to the supporting shaft 103. As a result, a rotation torque of the second electric motor 239 is transmitted to the second gear 230 through an intergear 238 and the rotational movement of the gear 230 is transmitted to the supporting plate 110 through a second lift lever 237, which is respectively linked by ball and socket joints to the gear 230 and the supporting plate 110, to thereby swing the mirror in an upward- and downward direction. On the rear surface of the second gear 230, a copper ring 233 is fixed as in the first gear 220 and a pair of brush springs 236 and 237 slide thereon. They constitute likewise a set position stopping device.

Numeral 240 designates a lever axially movably supported by the second casing 102 and its forward end is linked by a ball and socket joint to the rear surface of the supporting plate 110. The mirror 111 is accordingly prevented from being rotated with respect to the supporting shaft 103.

Numerals 241 and 242 designate circular openings formed in the second casing 102 so that the levers 227 and 237 can be movable within the openings.

Figure 11:
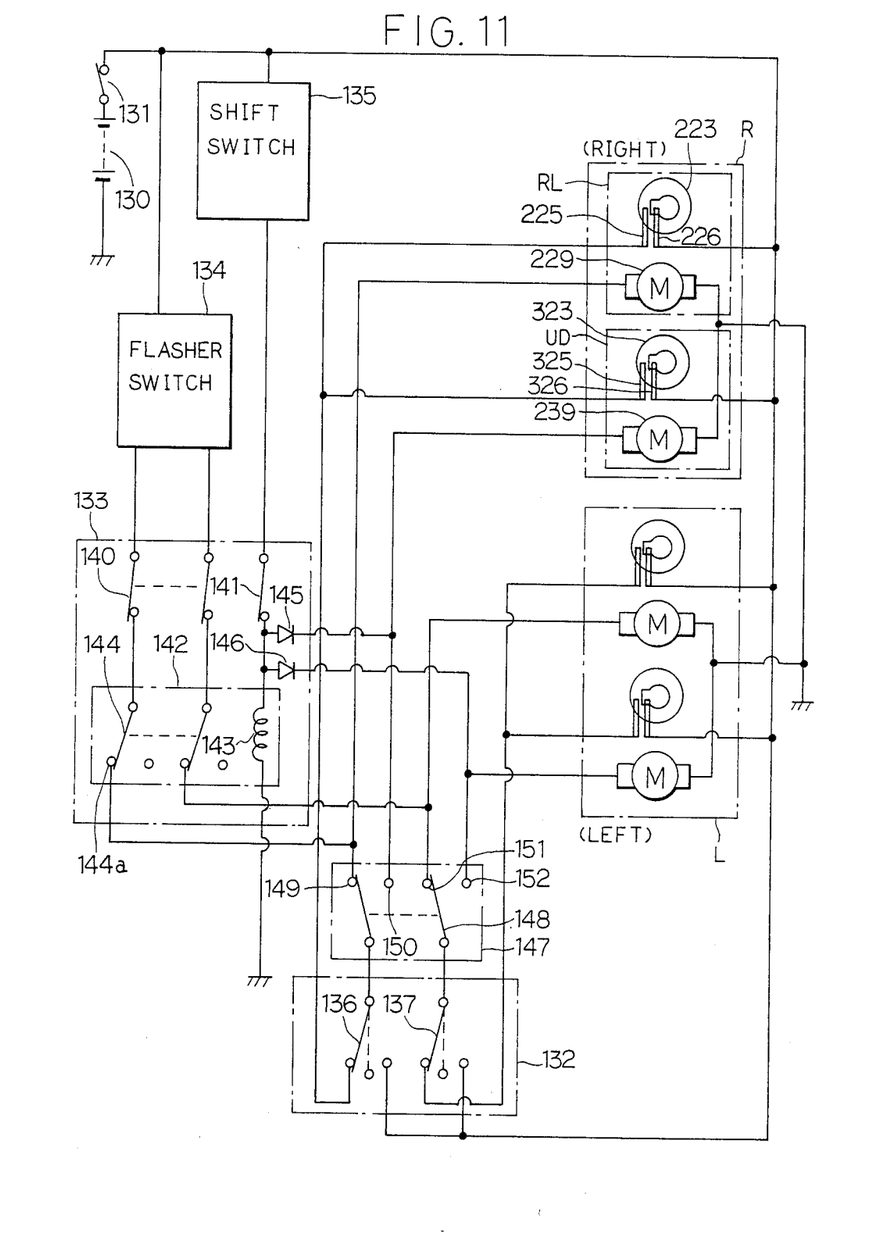
FIG. 11 is a control circuit for the driving apparatus of the second embodiment.

A control circuit for the above-described second embodiment of the present invention will be explained with reference to FIG. 11.

R and L show schematic electric wiring diagrams for the above-described driving apparatuses attached to the righthand and the lefthand portions of the motor vehicle, wherein RL and UD respectively designate driving portions for driving the mirror in the right- and lefthand direction and in the upward- and downward direction.

Numeral 147 designates a manual switch for switch over from RL to UD and vice versa, fixed contacts 149 to 152 of which are connected to the respective electric motors and movable contacts 148 of which are selectively connected to those fixed contacts. The other construction is substantially the same as that of the first embodiment and its operation is almost the same as the first embodiment except that the motors 229 and 329 is selectively driven by the manual switch 147.

A third embodiment of the present invention will be next explained with reference to FIGS. 12 to 14.

Figure 12:
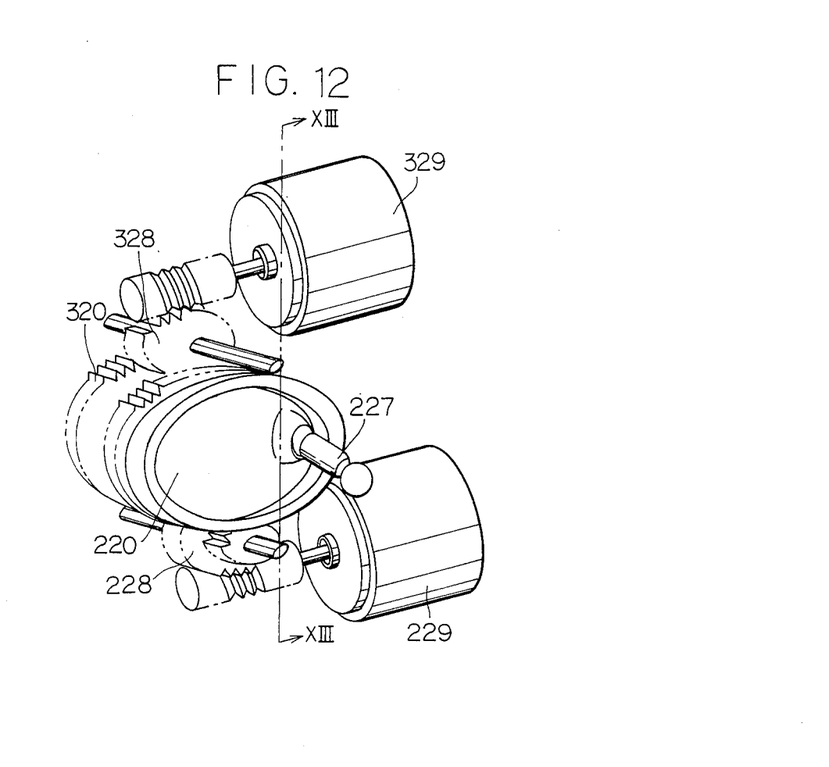
FIG. 12 is a perspective view showing a principal portion of a side-mirror driving apparatus according to the third embodiment of the present invention.
Figure 13:
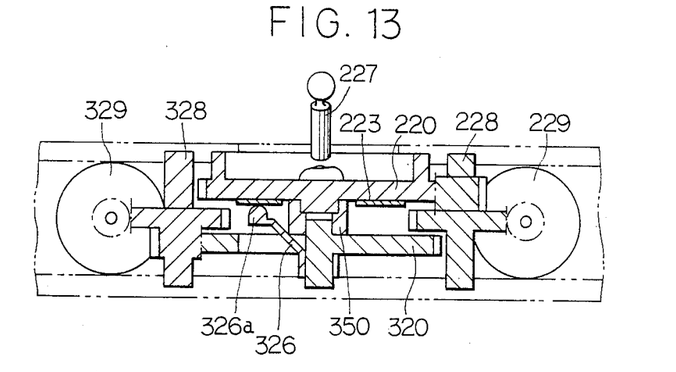
FIG. 13 is a cross-sectional view taken along a line XIII—XIII in FIG. 12.
Figure 14:
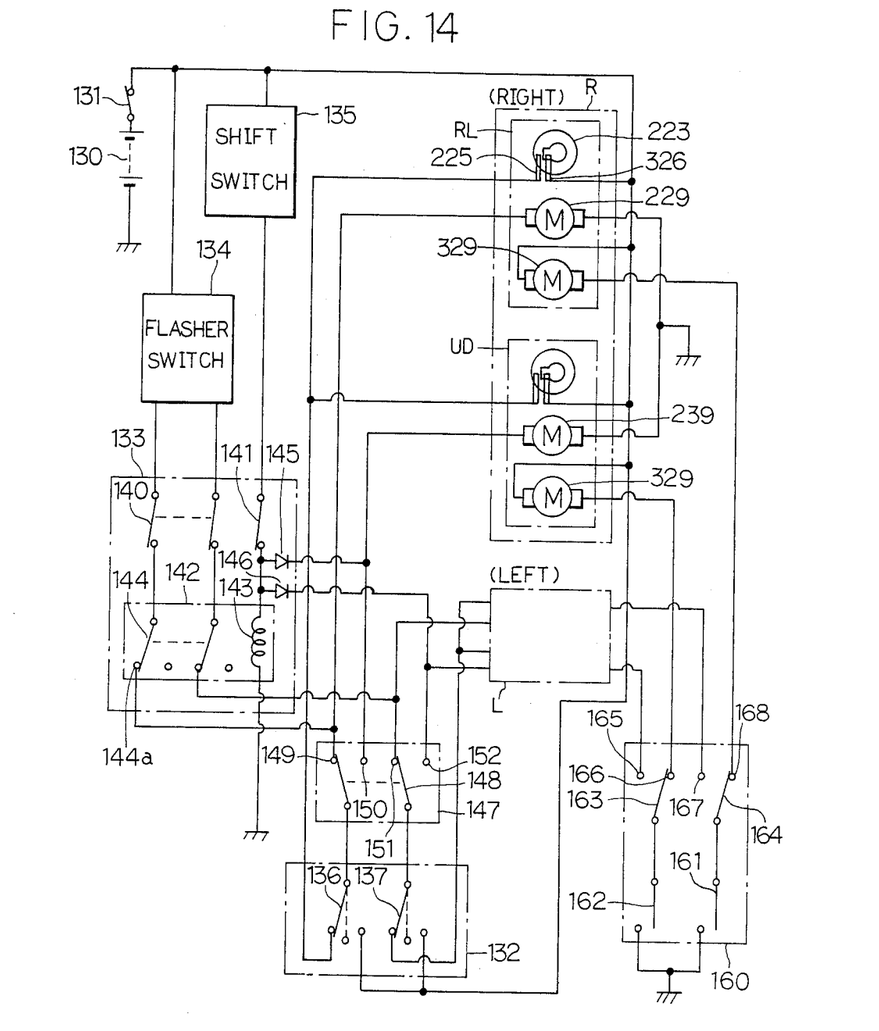
FIG. 14 is a control circuit for the driving apparatus of the third embodiment.

FIGS. 12 and 13 show only a principal portion of this embodiment, wherein numeral 320 designates a third gear arranged coaxially with and at a rear surface side of a first gear 220, and each shaft of the gears is connected with each other by means of a bearing 350 so that the gear 220 and gear 320 can rotate independently. The gear 320 is connected to a third electric motor 329 through a reduction gear 328.

On the rear surface of the first gear 220, a copper ring 223 is fixed, which is the same as that of the second embodiment, and a forward end of the first brush spring (not shown) secured to the driving housing is always in contact with the copper ring. One end of the second brush spring 326 is secured to the third gear 320, while the other (forward) end 326a slides on the copper ring. Accordingly, the second brush spring moves in accordance with the rotation of the gear 320 and changes its relative position with respect to the first brush spring.

The above construction is also employed to the second gear (not shown).

A control circuit for the above-described third embodiment will be next explained with reference to FIG. 14.

In driving circuits RL and UD of the righthand and lefthand driving units R and L for operations in a right- and leftward direction as well as an upward- and downward direction, other (the third) motors 329 are added and each one end of the motors is connected to the battery 130 while each of the other ends is connected to a manual switch 160.

The manual switch 160 is one for adjusting the mirror at a desired position and includes movable contacts 161 to 164 and fixed contacts 165 to 168.

When the contact 161 is closed and the movable contact 164 is contacted with the fixed contact 168, electric current is supplied to the electric motor 329 of the driving circuit RL and the brush spring 326 is rotated together with the gear 320 driven by the motor 329. Accordingly, the brush spring 326 becomes in contact with the copper ring 223 so that current supply to the motor 229 begins through the brush spring 326, the copper ring 223, the brush spring 225 and the movable contacts 136 and 148. When the switch 161 is opened and the power supply to the motor 329 is stopped, the rotation of the brush spring 326 is stopped. The power supply to the motor 229 is stopped when the connection between the brush spring 326 and the copper ring 223 is cut off. As above, the mirror can be freely adjusted in the right- and leftward direction. The mirror position in the upward- and downward direction can be adjusted by the movable contact 163.

The linkage operation with the flasher switch 134, when the motor vehicle is turned to the right or the left and so on, is the same as that of the second embodiment.

What is claimed is:

1. A side-mirror driving apparatus comprising:
   a mirror driving housing;
   a supporting shaft fixed to said housing;
   a mirror swingably supported at a forward end of said supporting shaft; and
   a driving means for inclining said mirror, wherein the driving means comprises:
   at least one gear rotatably supported by said housing;
   an electric motor for rotating said gear;
   at least one lift lever, one end of which is swingably linked to the rear surface of said mirror and the other end of which is operatively connected to the front surface of said gear; and
   a set position stopping device arranged at a side of the rear surface of said gear for stopping said gear at a desired position.

2. A side-mirror driving apparatus as set forth in claim 1, wherein said driving means comprises a ring-formed cam at the front surface of said gear,
   said lift lever is axially slidably supported by said housing, and said other end of said lift lever is abutting on said cam.

3. A side-mirror driving apparatus comprising:
a mirror housing;
a supporting shaft fixed to said mirror housing;
a mirror swingably supported at a forward end of said supporting shaft; and
a driving means for inclining said mirror, wherein said driving means comprises:
a first and a second gears rotatably supported by said mirror housing;
a first and a second electric motors for independently driving said first and second gears;
a first and a second lift levers, each one end of which is swingably linked to the front surface of said first and second gears and each of the other ends of which is swingably linked to a predetermined position at the rear surface of said mirror; and
a first and a second set position stopping devices arranged at the respective rear surfaces of said first and second gears for stopping said first and second gears at their initial positions.

4. A side-mirror driving apparatus as set forth in claim 3 further comprising:
a mirror-rotation preventing pin axially slidably supported by said mirror housing, one end of which is swingably secured to a predetermined position at the rear surface of said mirror.

5. A side-mirror driving apparatus as set forth in claim 3, wherein said set position stopping device comprises:
an electrically-conductive ring secured to the rear surface of one of said gears and having a notch at a portion thereof;
a first brush spring secured to said housing and always in contact with said ring; and
a second brush spring in alternate contact with said ring and said notch.

6. A side-mirror driving apparatus as set forth in claim 5, further comprising:
another gear arranged coaxially with and at the rear surface side of one of said gears; and
another electric motor for driving said another gear, wherein said second brush spring is secured to said another gear.

* * * * *